United States Patent Office 2,751,375
Patented June 19, 1956

2,751,375

PURIFICATION PROCESS FOR FLUORINE-CONTAINING POLYMERS

Russell M. Mantell, Orange, and William S. Barnhart, Cranford, N. J., assignors to The M. W. Kellogg Company, Jersey City, N. J., a corporation of Delaware No Drawing. Application March 10, 1953,
Serial No. 341,606

17 Claims. (Cl. 260—92.1)

This invention relates to a process for purifying halogenated polymers. In one of its aspects, this invention relates to the reclamation of contaminated halogenated polymers.

In effecting polymerization reactions various promoters, activators and accelerators such as salts of cobalt, silver, copper, molybdenum, iron etc., are employed. While many different washing procedures have been developed for removing these additives, complete removal is not always effected. In addition, during polymerization reactions, particularly where the reaction is effected in a metallic reaction chamber, small quantities of metal and metal corrosion products, such as iron, may become incorporated within the polymer. It has been discovered that the presence of trace amounts of certain of the above described impurities have a deleterious effect on the ultimate polymer. It has further been discovered that materials which have a deleterious effect on the polymer may be removed by the process of this invention. The process of this invention is therefore applicable to the recovery of contaminated scrap polymer and the purification of commercial grade polymer to produce an ultimate polymer of improved physical and chemical characteristics.

It is an object of this invention to provide a process for purifying halogenated polymers.

It is another object of this invention to provide a process by which halogenated polymers of extremely high purity may be prepared.

It is a further object of this invention to produce polymers of high molecular weight with greater heat stability by removing trace contaminants from the polymer by the process of this invention.

It is a still further object of this invention to provide a process wherein contaminated halogenated polymers may be reclaimed.

It is a still further object of this invention to provide a process wherein polymers possessing superior physical and chemical characteristics are obtained by treating contaminated halogenated polymers.

Various other objects will become apparent to those skilled in the art on reading the accompanying description and disclosure.

This invention presents a novel, practical, and efficient method for purifying and reclaiming halogenated polymers. Illustrative of the types of polymeric materials which may be purified and reclaimed by the process of this invention are those homopolymers and copolymers produced from olefinic monomers containing fluorine which are substantially insoluble in the acid employed to effect purification such as, tetrafluoroethylene, trifluorochloroethylene, perfluoropropene, and perfluorobutadiene and copolymers prepared by copolymerizing the above, particularly tetrafluoroethylene, and trifluorochloroethylene with varying quantities of one or more of the following ethylene, vinyl chloride, vinyl fluoride, vinylidene chloride, vinylidene fluoride and trichloroethylene.

It has been discovered that certain carboxylic acids possess the power to wet and penetrate halogenated polymers and in addition have an affinity for objectionable impurities which are present in the polymer. When used to purify a contaminated polymer, carboxylic acids of the type described herein thoroughly penetrate the polymer thereby intimately contacting the impurity. The acid reacts with and dissolves the impurity, usually by forming soluble complexes with the impurity. Polymers recovered from this treatment, because objectionable impurities have been removed, have excellent thermal stability etc. The presence of impurities which are not susceptible to removal by this treatment, for example silica, has been found to have no adverse effect on the stability etc. of the ultimate polymer.

Those acids which are suited to the process of this invention are the substituted and unsubstituted carboxylic acids, wherein the substituent is a chlorine, fluorine, diamine, alkyl or phenyl group or groups, having not less than 2 and not more than 14 carbon atoms in the molecule such as ethylene diamine tetraacetic acid, ethylene diamine tetrapropionic acid, propylene diamine tetraacetic acid, phenylene diamine, tetraacetic acid, etc., benzoic acid, chlorobenzoic acid, phenylacetic acid, phenyl propionic acid, toluic acid, phthalic acid, etc., succinic acid, glutaric acid, adipic acid, etc. and preferably carboxylic acids, having not less than 2 and not more than 5 carbon atoms in the molecule, such as trichloroacetic acid, mono-, di-, and trifluoroacetic acid, fluoro and chloropropionic acid, and more preferably acetic acid, propionic acid, butyric acid and valeric acid. The diamine tetraacids are commercially available as Versene, Sequestrene, Chel, etc. and are usually di-sodium salts in aqueous solutions.

For efficient operation of this invention, the contaminant must be contacted by the acid employed. While not mandatory it is preferred that the polymer be in a finely divided state. If not already finely divided the polymer may be ground prior to treatment. The degree of fineness to which the polymer is ground will be determined by several factors. On one hand, excessive grinding with its attendant heating of the material due to friction, may result in the degradation of the polymer; on the other hand if the material is not ground fine enough, operational procedures may become excessively prolonged. It has been observed that grinding the material between about 10 and about 150 mesh is usually adequate. The preferred range of fineness is between about 40 and about 120 mesh.

The temperature and pressure at which operations are conducted will be determined by the nature of the polymer being purified and by the nature and extent of contamination. Thus, where the polymer would be adversely affected at an elevated temperature, reduced temperatures may be employed. Operations at the selected lower temperature range may be effected by thermostatic control of the temperature or by operation at sufficiently reduced pressure so that the solution has, as its boiling point, the desired temperature. When desired, for example when the extent of contamination is such that an extremely high temperature is advantageous, operations may be conducted at superatmospheric pressures, and therefore, at temperatures considerably above boiling point of the solution. Because of the ease with which temperatures may be controlled and because considerably less expensive equipment is required, it is preferred to conduct operations near the boiling point of the solution at atmospheric pressures.

The contact time will vary in accordance with conditions of operation. The nature and quantity of the impurities present and the fineness of the material being treated must all be taken into consideration. In addition, the temperature at which operations are conducted will influence the required contact time. The lower the temperature employed the longer will be the necessary time. Generally an interval between about 10 minutes and about 40 hours has been found to be adequate; preferred time is between about 1 and about 26 hours.

In general, the contaminant present in the polymer is contacted by mixing the finely divided polymer with a quantity of an acid selected from the group described herein. The quantity of acid employed may be varied over a wide range but preferably will be between about 2 and about 20 times the weight of polymer. A particularly suitable quantity of acid is between about 3 and about 7 times the weight of polymer. The acid is maintained in contact with the polymer at a suitable temperature and for a suitable period of time as described above. Recovery of the polymer is effected by filtration or decantation. The polymer is then washed free of acid and dried. Since the polymers which are to be treated by the process of this invention are substantially insoluble in the acids employed, it may be found convenient to stir or agitate the mixture. "Bumping" and local overheating are thereby avoided. The mixture may be stirred or agitated by conventional techniques. When desired, for example when the reagent is solid, the presence of an inert diluent or solvent such as carbon tetrachloride, benzene, methanol, etc. may be included to furnish intimate contact between reagent and polymer.

Two illustrative types of washing procedure are described herein. It will be apparent to those skilled in the art that these procedures may be modified or altered without departing from the scope of this invention. One type of washing procedure to which the filtered polymer may be subjected comprises a plurality of washings and boilings with water with subsequent filtrations followed by a plurality of washings and boilings with an alcohol, such as methyl alcohol, with subsequent filtrations. The recovered filtered polymer is then dried at an elevated temperature, for example at a temperature between about 120° C. and 150° C. Another type of washing procedure comprises a plurality of washings and boilings with an alcohol such as methyl alcohol until test of the wash liquid for presence of acid is negative. Hot or cold water, water-acid or water-alcohol mixtures may be used for washing.

The following examples are offered for a better understanding of the invention. It will be apparent to those skilled in the art that the procedures described in the examples may be modified and that substantially insoluble halogenated polymers other than polytrifluorochloroethylene may be treated without departing from the scope of this invention. Hence, these examples are not to be construed as unnecessarily limiting.

*Example I*

Approximately 40 gms. of finely ground polytrifluorochloroethylene having a viscosity of about .62 centistoke and a calculated no strength temperature (N. S. T.) of about 256 was mixed with about 200 ml. of acetic acid. The resulting admixture was heated to boiling and gently refluxed for about 24 hours. The refluxed admixture was then filtered, washed and dried as described herein. Viscosity of the recovered polymer was .67 centistoke and its calculated N. S. T. 271. On heat aging at 275° C. for 24 hours the viscosity of the treated and recovered polymer dropped to .52 centistoke and a calculated N. S. T. of 224 whereas the untreated polymer was degraded to a viscosity of .46 centistoke and a calculated N. S. T. of below 220. The viscosity was determined using 0.5 percent concentration of polymer in dichlorobenzotrifluoride. The calculation of N. S. T. was based on an empirical relation between viscosity and N. S. T.

*Example II*

Approximately 40 gms. of finely ground polytrifluorochloroethylene was mixed with about 200 ml. of 50% aqueous trichloroacetic acid. The resulting admixture was heated to boiling and gently refluxed for about 24 hours. The refluxed admixture was then filtered and washed as described herein. The recovered polymer was examined and was found substantially equivalent to the recovered polymer of Example I.

*Example III*

Approximately 40 gms. of finely ground polytrifluorochloroethylene was mixed with about 200 ml. of 90% aqueous acetic acid containing 1 gm. of ethylenediamine tetraacetic acid. The resulting admixture was heated to boiling and gently refluxed for about 24 hours. The refluxed admixture was then filtered and washed as described herein. The recovered polymer was examined and was found substantially equivalent to the recovered polymer of Example I.

Having described our invention we claim:

1. A process for removing metallic impurities from a polymer of tetrafluoroethylene which comprises extracting metallic impurities from said polymer, said polymer being in finely divided form between about 10 and about 150 mesh, with between about 2 and about 20 times its weight of acetic acid maintaining said acid in contact with said polymer and contaminants at a temperature between room temperature and the boiling point of the acid for a period of time between about 1 and about 24 hours and recovering the polymer substantially free of metallic impurities as a product of the process.

2. A process for removing metallic impurities from a polymer of perfluoropropene which comprises extracting metallic impurities from said polymer, said polymer being in finely divided form between about 10 and about 150 mesh, with between about 2 and about 20 times its weight of acetic acid maintaining said acid in contact with said polymer and contaminants at a temperature between room temperature and the boiling point of the acid for a period of time between about 1 and about 24 hours and recovering the polymer substantially free of metallic impurities as a product of the process.

3. A process for removing metallic impurities from a polymer of perfluorobutadiene which comprises extracting metallic impurities from said polymer, said polymer being in finely divided form between about 10 and about 150 mesh, with between about 2 and about 20 times its weight of acetic acid maintaining said acid in contact with said polymer and contaminants at a temperature between room temperature and the boiling point of the acid for a period of time between about 1 and about 24 hours and recovering the polymer substantially free of metallic impurities as a product of the process.

4. A process for removing metallic impurities from a polymer of vinylidene fluoride which comprises extracting metallic impurities from said polymer, said polymer being in finely divided form between about 10 and about 150 mesh, with between about 2 and about 20 times its weight of acetic acid maintaining said acid in contact with said polymer and contaminants at a temperature between room temperature and the boiling point of the acid for a period of time between about 1 and about 24 hours and recovering the polymer substantially free of metallic impurities as a product of the process.

5. A process for removing metallic impurities from a fluorine-containing polymer which comprises extracting metallic impurities from said polymer with a carboxylic acid having not less than 2 and not more than 14 carbon atoms in the molecule and recovering the polymer substantially free of metallic impurities as a product of the process.

6. The process of claim 5 wherein the carboxylic acid is acetic acid.

7. The process of claim 5 wherein the carboxylic acid is propionic acid.

8. The process of claim 5 wherein the carboxylic acid is trichloroacetic acid.

9. The process of claim 5 wherein the carboxylic acid is ethylenediamine tetraacetic acid.

10. The process of claim 5 wherein the carboxylic acid is phenylenediamine tetraacetic acid.

11. A process for removing metallic impurities from a fluorine-containing polymer which comprises extracting metallic impurities from said polymer with a carboxylic acid having not less than 2 and not more than 14 carbon atoms in the molecule at a temperature between room temperature and the boiling point of said carboxylic acid for a period of time between about 10 minutes and about 26 hours and recovering the polymer substantially free of metallic impurities as a product of the process.

12. The process of claim 11 wherein the polymer free of contaminants is recovered by filtration.

13. The process of claim 11 wherein the polymer free of contaminants is recovered by decantation.

14. A process for removing metallic impurities from a fluorine-containing polymer which comprises extracting metallic impurities from said polymer with a carboxylic acid at superatmospheric pressure and at a temperature above the boiling point of said acid at atmospheric pressure for a period of time between about 10 minutes and about 24 hours and recovering the polymer substantially free of metallic impurities as a product of the process.

15. A process for removing metallic impurities from a polymer of chlorotrifluoroethylene which comprises extracting metallic impurities from said polymer, said polymer being in finely-divided form between about 10 and about 150 mesh, with between 2 and about 20 times its weight of acetic acid at a temperature between room temperature and the boiling point of the acid for a period of time between about 1 and about 24 hours and recovering the polymer substantially free of metallic impurities as a product of the process.

16. The process of claim 15 wherein the recovered polymer is subjected to a plurality of washings and boilings with water with subsequent filtrations, a plurality of washings and boilings with methyl alcohol with subsequent filtrations, and finally dried by heating at elevated temperatures.

17. The process of claim 15 wherein the recovered polymer is subjected to a plurality of washings and boilings with methyl alcohol with subsequent filtrations, until test of the wash liquid for the presence of acid is negative and finally dried by heating at elevated temperatures.

References Cited in the file of this patent

UNITED STATES PATENTS 2,137,627        Reed ------------------ Nov. 22, 1938